(12) United States Patent
Hong

(10) Patent No.: US 11,197,192 B2
(45) Date of Patent: *Dec. 7, 2021

(54) NETWORK CONNECTION MANAGEMENT METHOD, DEVICE AND SYSTEM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 29 days.

This patent is subject to a terminal disclaimer.

(21) Appl. No.: 16/637,751

(22) PCT Filed: Aug. 9, 2017

(86) PCT No.: PCT/CN2017/096674
§ 371 (c)(1),
(2) Date: Feb. 8, 2020

(87) PCT Pub. No.: WO2019/028712
PCT Pub. Date: Feb. 14, 2019

(65) Prior Publication Data
US 2020/0213899 A1 Jul. 2, 2020

(51) Int. Cl.
*H04W 28/02* (2009.01)
*H04W 76/30* (2018.01)
(Continued)

(52) U.S. Cl.
CPC ..... *H04W 28/0289* (2013.01); *H04W 68/005* (2013.01); *H04W 76/10* (2018.02);
(Continued)

(58) Field of Classification Search
None
See application file for complete search history.

(56) References Cited

U.S. PATENT DOCUMENTS 7,400,886 B2 * 7/2008 Sahim ............... H04L 29/06027
455/436
8,078,171 B2 * 12/2011 Taaghol ................ H04W 36/14
455/436
(Continued)

FOREIGN PATENT DOCUMENTS

CN 101730105 A 6/2010
CN 101801055 A 8/2010
(Continued)

OTHER PUBLICATIONS

Massimo et al. "Seamless Interworking of WLANs and Cellular Networks: Architecture and Performance Issues in a Mobile IPv6 Scenario" (Year: 2005).*

(Continued)

*Primary Examiner* — Jamaal Henson
(74) *Attorney, Agent, or Firm* — Syncoda LLC; Feng Ma

(57) ABSTRACT

A network connection management method includes: when a preset network congestion event is detected, determining a target terminal, which is to be removed, among terminals which have currently accessed a local area network established by an AP; acquiring information, sent by the target terminal, about a cellular network standard supported by the target terminal; and if the information about the cellular network standard supported by the target terminal satisfies a preset network switching condition, sending a network switching notification to the target terminal, so as to enable the target terminal to be disconnected from the local area network and to access the cellular network. Data transmission rate of the terminal can therefore be improved.

17 Claims, 7 Drawing Sheets

(51) Int. Cl.
   *H04W 76/10* (2018.01)
   *H04W 68/00* (2009.01)
   *H04W 84/12* (2009.01)
   *H04W 88/08* (2009.01)

(52) U.S. Cl.
   CPC ............ *H04W 76/30* (2018.02); *H04W 84/12* (2013.01); *H04W 88/08* (2013.01)

(56) References Cited

U.S. PATENT DOCUMENTS

| | | | | |
|---|---|---|---|---|
| 8,195,143 | B2* | 6/2012 | Erceg | H04W 36/28 455/419 |
| 10,728,816 | B2* | 7/2020 | Brown | H04W 76/16 |
| 2004/0023669 | A1* | 2/2004 | Reddy | H04W 36/32 455/456.1 |
| 2006/0152344 | A1* | 7/2006 | Mowery, Jr. | H04B 3/542 370/331 |
| 2007/0094374 | A1* | 4/2007 | Karia | H04L 61/2564 709/223 |
| 2008/0195638 | A1* | 8/2008 | Winberry | G01C 21/32 |
| 2010/0316021 | A1* | 12/2010 | Lerzer | H04W 36/02 370/331 |
| 2012/0099562 | A1* | 4/2012 | Smadi | H04W 36/08 370/332 |
| 2014/0105182 | A1* | 4/2014 | Montemurro | H04W 24/08 370/332 |
| 2016/0165508 | A1* | 6/2016 | Jin | H04W 36/165 370/331 |
| 2016/0219463 | A1* | 7/2016 | Mestanov | H04W 48/14 |
| 2016/0373989 | A1* | 12/2016 | Tinnakornsrisuphap | H04W 36/22 |
| 2017/0318506 | A1* | 11/2017 | Mestanov | H04W 36/0066 |
| 2019/0261232 | A1* | 8/2019 | Mestanov | H04W 36/0066 |

FOREIGN PATENT DOCUMENTS

| | | |
|---|---|---|
| CN | 102572973 A | 7/2012 |
| CN | 103108364 A | 5/2013 |
| CN | 103404196 A | 11/2013 |
| CN | 103491578 A | 1/2014 |
| CN | 103583065 A | 2/2014 |
| CN | 103607780 A | 2/2014 |
| CN | 104105137 A | 10/2014 |
| CN | 104602300 A | 5/2015 |

OTHER PUBLICATIONS

First office action of Chinese application No. 201780000785.4 dated Oct. 13, 2020.
International search report of PCT application No. PCT/CN2017/096674 dated Apr. 20, 2018.
Second office action of Chinese application No. 201780000785.4 dated Apr. 6, 2021.

* cited by examiner

NETWORK CONNECTION MANAGEMENT METHOD, DEVICE AND SYSTEM

CROSS-REFERENCE TO RELATED APPLICATION

The present application is a national stage of International Application No. PCT/CN2017/096674 filed on Aug. 9, 2017, the disclosure of which is hereby incorporated by reference in its entirety.

TECHNICAL FIELD

The present disclosure relates to the field of a wireless communication technology, and more particularly relates to a network connection management method, device and system.

BACKGROUND

With the development of Internet technologies, a variety of network devices (such as routers, mobile phones, tablet computers, etc.) have been widely used. A terminal may access a network through a device such as a router, and perform data transmission with the router based on a Wi-Fi (Wireless-Fidelity) protocol.

In the process of implementing the present disclosure, the inventors have found that the prior art has at least the following problems:

when there are a large number of terminal devices in a wireless local area network established through a router, serious lagging will occur in the terminal during data transmission in the local area network, resulting in a decrease in data transmission rate of the terminal.

SUMMARY

In order to solve the problems existing in the prior art, the present disclosure provides a network connection management method, device and system. The technical solutions are as follows:

In a first aspect, there is providing a network connection management method, which is applicable to an access point AP and comprises:

upon detecting a preset network congestion event, determining a target terminal to be disconnected among terminals currently accessing a local area network established by the AP;

acquiring information of a cellular network standard which is supported by the target terminal sent by the target terminal; and and sending a network switching notification to the target terminal when the information of the cellular network standard which is supported by the target terminal satisfies a preset network switching condition, so as to enable the target terminal to be disconnected from the local area network and to access a cellular network.

Optionally, the network congestion event comprises that a quantity of the terminals currently accessing the local area network exceeds a preset number threshold, or a transmission load ratio of the AP exceeds a preset ratio threshold.

Optionally, determining the target terminal to be disconnected among the terminals currently accessing the local area network established by the AP comprises:

determining, according to a current service type of each of the terminals currently accessing the local area network established by the AP and a priority order of pre-stored service types, a target terminal having a service type of a lowest priority among the terminals as a terminal to be disconnected.

Optionally, the method further comprises:

receiving the information of the cellular network standard which is supported by the target terminal sent by the target terminal, and storing the information of the cellular network standard which is supported by the target terminal.

Optionally, acquiring the information of the cellular network standard which is supported by the target terminal comprises:

sending a network standard inquiry message to the target terminal; and receiving the information of the cellular network standard which is supported by the target terminal sent by the target terminal.

Optionally, receiving the information of the cellular network standard which is supported by the target terminal sent by the target terminal comprises:

Receiving the information of the cellular network standard which is supported by the target terminal sent by the target terminal through a Probe Request frame; or receiving the information of the cellular network standard which is supported by the target terminal sent by the target terminal through an Association Request frame; or receiving the information of the cellular network standard which is supported by the target terminal sent by the target terminal through a WNM-Notification Request frame.

Optionally, the information of the cellular network standard which is supported by the target terminal includes a cellular network standard with a highest level which is supported by the target terminal.

Optionally, sending the network switching notification to the target terminal when the information of the cellular network standard which is supported by the target terminal satisfies the preset network switching condition, comprises:

sending a network switching notification to the target terminal when the cellular network standard with the highest level which is supported by the target terminal is not 2G.

Optionally, sending the network switching notification to the target terminal when the information of the cellular network standard which is supported by the target terminal satisfies the preset network switching condition, comprises:

acquiring a pre-stored reference transmission rate corresponding to the cellular network standard with the highest level which is supported by the target terminal; and sending a network switching notification to the target terminal when the reference transmission rate is greater than a currently actual transmission rate of the target terminal in the local area network.

In a second aspect, there is providing a network connection management method, which is applicable to a target terminal and comprises:

sending information of a cellular network standard which is supported by the target terminal to the AP;

receiving a network switching notification sent by the AP; and disconnecting from the local area network established by the AP, and accessing a cellular network.

Optionally, sending the information of the cellular network standard which is supported by the target terminal to the AP comprises:

sending the information of the cellular network standard which is supported by the target terminal to the AP through a Probe Request frame; or sending the information of the cellular network standard which is supported by the target terminal to the AP through an Association Request frame; or sending the information of the cellular network standard which is supported by the target terminal to the AP through a WNM-Notification Request frame.

Optionally, the information of the cellular network standard which is supported by the target terminal includes a cellular network standard with a highest level which is supported by the target terminal.

Optionally, accessing the cellular network comprises:

accessing a cellular network according to the cellular network standard with the highest level which is supported by the target terminal.

In a third aspect, there is providing an access point AP, comprising:

a determination module, configured to, upon detecting a preset network congestion event, determine a target terminal to be disconnected among terminals currently accessing a local area network established by the AP;

an acquisition module, configured to acquire information of a cellular network standard which is supported by the target terminal sent by the target terminal; and a first sending module configured to, send a network switching notification to the target terminal when the information of the cellular network standard which is supported by the target terminal satisfies a preset network switching condition so as to enable the target terminal to be disconnected from the local area network and to access the cellular network.

Optionally, the network congestion event is configured to a case that a quantity of terminals accessing the local area network exceeds a preset number threshold, or a transmission load ratio of the AP exceeds a preset ratio threshold.

Optionally, the determination module is further configured to:

determine, according to a current service type of each terminal currently accessing the local area network established by the AP and a priority order of pre-stored service types, a target terminal having a service type with a lowest priority among the terminals as a terminal to be disconnected.

Optionally, the AP further comprises:

a storage module, configured to receive the information of the cellular network standard which is supported the target terminal sent by the target terminal, and store the information of the cellular network standard which is supported by the target terminal.

Optionally, the acquisition module is configured to:

send a network standard inquiry message to the target terminal; and receive the information of the cellular network standard which is supported by the target terminal sent by the target terminal.

Optionally, the acquisition module is further configured to:

receive the information of the cellular network standard which is supported by the target terminal sent by the target terminal through a Probe Request frame; or receive the information of the cellular network standard which is supported by the target terminal sent by the target terminal through an Association Request frame; or receive the information of the cellular network standard which is supported by the target terminal sent by the target terminal through a WNM-Notification Request frame.

Optionally, the information of the cellular network standard which is supported by the target terminal includes a cellular network standard with a highest level which is supported by the target terminal.

Optionally, the first sending module is configured to:

send a network switching notification to the target terminal when the cellular network standard with the highest level which is supported by the target terminal is not 2G.

Optionally, the first sending module is further configured to:

acquire a pre-stored reference transmission rate corresponding to the cellular network standard with the highest level which supported by the target terminal; and send a network switching notification to the target terminal when the reference transmission rate is greater than a currently actual transmission rate of the target terminal in the local area network.

In a fourth aspect, there is providing a terminal, comprising:

a second sending module configured to send an information of a cellular network standard which is supported by the target terminal to the AP;

a receiving module configured to receive a network switching notification sent by the AP; and a switching module configured to disconnect from a local area network established by the AP and access a cellular network.

Optionally, the second sending module is configured to:

send the information of the cellular network standard which is supported by the target terminal to the AP through a Probe Request frame; or send the information of the cellular network standard which is supported by the target terminal to the AP through an Association Request frame; or send the information of the cellular network standard which is supported by the target terminal to the AP through a WNM-Notification Request frame.

Optionally, the information of the cellular network standard which is supported by the target terminal includes a cellular network standard with a highest level which is supported by the target terminal.

Optionally, the switching module is configured to:

access a cellular network according to the cellular network standard with the highest level which is supported by the target terminal.

In a fifth aspect, there is providing a network connection management system, comprising an access point AP and a target terminal, wherein the AP is the AP according to the third aspect; and the terminal is the terminal according to the fourth aspect.

In a sixth aspect, an access point AP is provided, comprising a processor and a memory in which at least one instruction is stored, the instructions being loaded and executed by the processor to implement any of the network connection management methods of the first aspect.

In a seventh aspect, a terminal is provided, comprising a processor and a memory in which at least one instruction is stored, the instructions being loaded and executed by the processor to implement the network connection management method of the second aspect.

In an eighth aspect, a computer readable storage medium is provided, wherein at least one instruction is stored in the storage medium, the instructions being loaded and executed by the processor to implement the network connection management method of the first aspect.

In a ninth aspect, a computer readable storage medium is provided, wherein at least one instruction is stored in the storage medium, the instructions being loaded and executed by the processor to implement the network connection management method of the second aspect.

The technical solutions provided by the embodiments of the present disclosure have the following beneficial effects:

In the embodiments of the present disclosure, when a large number of terminal devices are used in a wireless local area network established by a router, one or some of the terminals can be switched to a cellular network in time and continue to perform data transmission, such that serious lagging of data transmission of the terminal in the local area network is avoided, thereby increasing a data transmission rate of the terminal.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

An exemplary embodiment of the present disclosure provides a network connection management method, which can be implemented by a terminal together with an AP. The terminal may be a device such as a smart phone, a smart watch, or a tablet computer, which can access both a wireless local area network and a cellular network. The AP may be a wireless network access point or router deployed by major service providers.

The terminal may include components such as a processor, a memory, a transceiver, and the like. The processor may be a central processing unit (CPU) or the like, and may be configured to perform processing related to network switching. The transceiver can be configured to send information of a cellular network standard which is supported by a target terminal, receive network standard inquiry information, and receive a network switching notification. The memory may be a random-access memory (RAM), Flash, or the like, and can be configured to store received data, data required for processing, data generated during processing, etc., such as the network standard inquiry information and the network switching notification.

The AP may include components such as a processor, a memory, a transceiver and the like. The processor may be a CPU or the like, and may be configured to detect a network congestion event, compare a reference transmission rate of a cellular network standard which is supported by the target terminal with a current actual transmission rate of the local area network, etc. The transceiver may be configured to receive information of the cellular network standard which is supported by the target terminal, send the network standard inquiry message, and send the network switching notification, etc. The memory may be RAM, Flash, etc., and may be configured to store received data, data required for processing, data generated during processing, and the like, such as the information of the cellular network standard which is supported by the target terminal.

Figure 1:
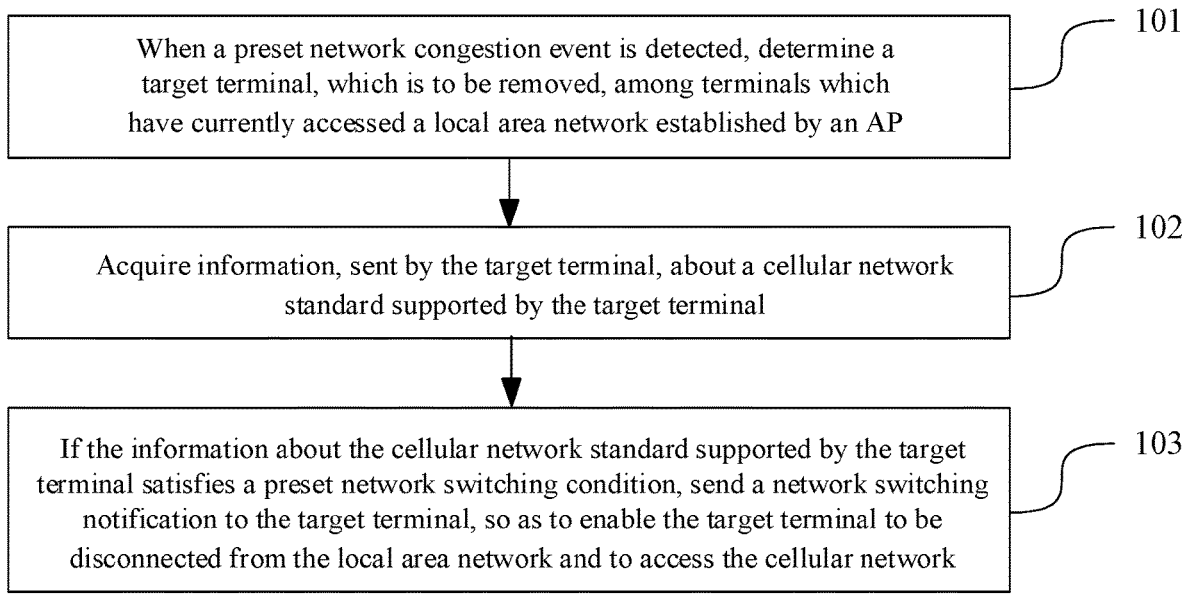
FIG. 1 is a flowchart of a network connection management method according to an embodiment of the present disclosure.

An embodiment of the present disclosure provides a network connection management method, which is applicable to an AP. As illustrated in FIG. 1, the corresponding steps may be as follows.

In step 101, when a preset network congestion event is detected, a target terminal to be disconnected is determined among terminals currently accessing a local area network established by the AP.

In step 102, a network standard inquiry message is sent to the target terminal.

In step 103, information of a cellular network standard which is supported by the target terminal sent by the target terminal is received.

In step 104, when the information of the cellular network standard which is supported by the target terminal satisfies a preset network switching condition, a network switching notification is sent to the target terminal, so as to enable the target terminal to be disconnected from the local area network and to access the cellular network.

Figure 2:
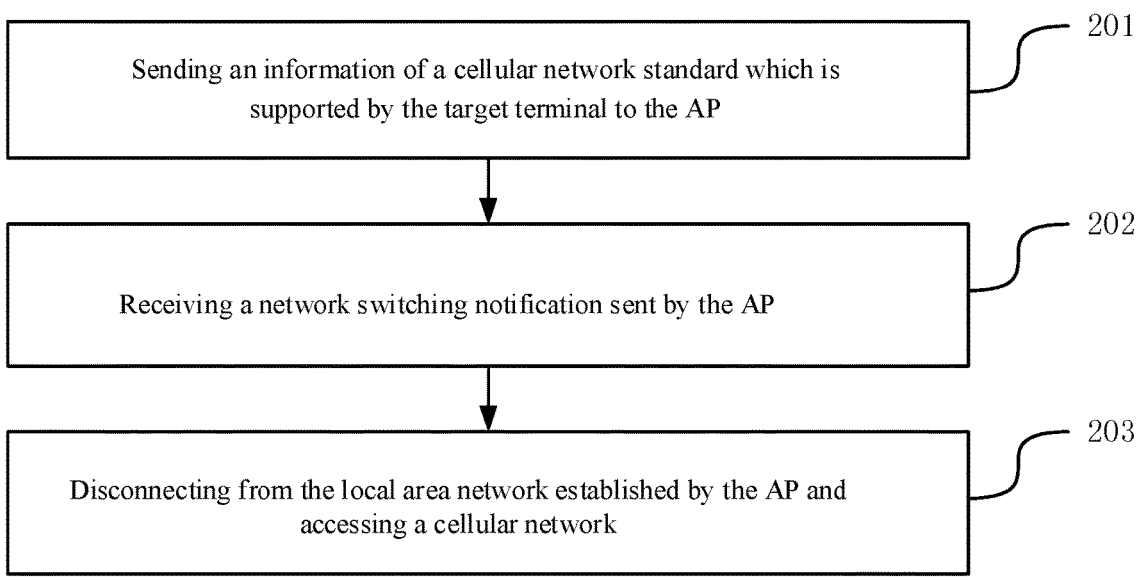
FIG. 2 is a flowchart of a network connection management method according to an embodiment of the present disclosure.

An embodiment of the present disclosure further provides a network connection management method, which is applicable to a target terminal. As illustrated in FIG. 2, the corresponding steps may be as follows.

In step 201, a network standard inquiry message sent by an AP is received.

In step 202, an information of a cellular network standard which is supported by the target terminal is sent to the AP.

In step 203, a network switching notification sent by the AP is received.

In step 204, a local area network established by the AP is disconnected, and a cellular network is accessed.

Figure 3:
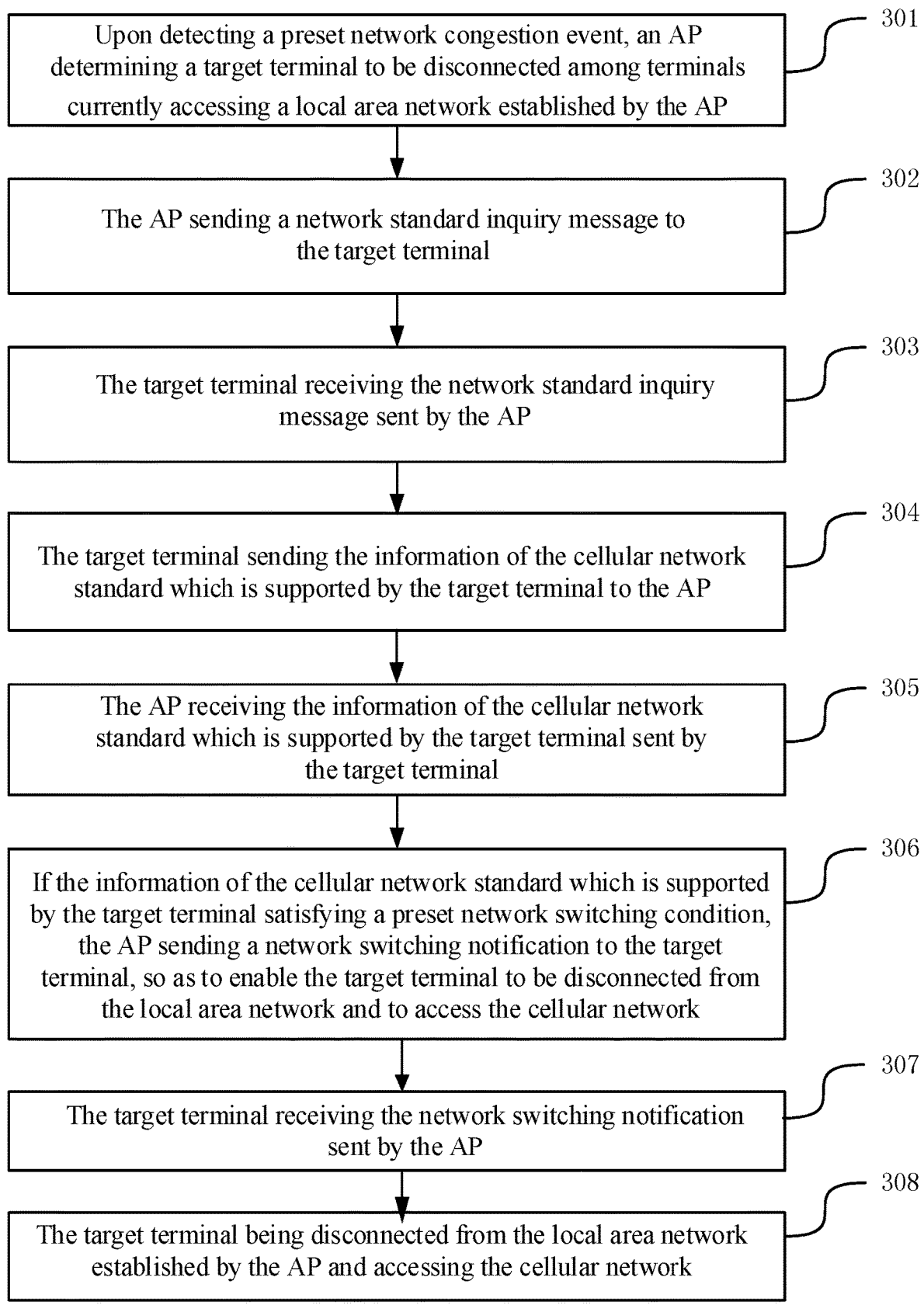
FIG. 3 is a flowchart of a network connection management method according to an embodiment of the present disclosure.

In order to make the objects, technical solutions and advantages of the present disclosure clearer, the processing flow illustrated in FIG. 3 will be described in detail below in connection with the embodiments. The contents may be as follows.

In step 301, upon detecting a preset network congestion event, an AP determines a target terminal to be disconnected among terminals currently accessing a local area network established by the AP.

During implementation, in the case that a wireless local area network is established by the AP, the terminal device can access the local area network, and perform data transmission with the AP under a Wi-Fi protocol. When there are a large number of terminal devices in the local area network, a congestion occurs in the network, resulting in a decrease in a transmission rate of the terminal. When the congestion reaches a preset limit, the AP can select a target terminal according to a preset selection method among the terminals currently accessing the local area network established by the AP, and further analysis are performed on the target terminal to determine whether the target terminal undergoes network switching. The method of selecting the target terminal may be arbitrarily set based on actual requirements, for example, randomly selected, or preset by a user.

Optionally, the preset limit of network congestion can be set by a technician. The preset limit may be as follows: the quantity of terminals accessing the local area network exceeds a preset number threshold, or a transmission load ratio of the AP exceeds a preset ratio threshold.

During implementation, the number threshold of the quantity of terminals and the ratio threshold of the transmission load ratio may be set respectively according to the type of the AP. For example, the preset number threshold is 200, and the preset ratio threshold is 90%. Then, when the quantity of the terminals accessing the local area network exceeds 200, or the transmission load ratio of the AP exceeds 90%, the AP may consider that a network congestion event occurs and then process the network congestion event.

Optionally, among the terminals currently accessing the local area network established by the AP, a target terminal to be disconnected can be selected based on priorities of service types through which data are transmitted by the terminals. The corresponding selection method may be as follows: determining, according to a current service type of each terminal currently accessing the local area network established by the AP and a priority order of pre-stored service types, a target terminal having a service type with a lowest priority is determined among the terminals as a terminal to be disconnected.

The service type refers to the current service type of data transmitted by the AP.

During implementation, upon detecting a network congestion event, the AP may select a terminal with the lowest service priority among the terminals currently accessing the current local area network, such that this terminal is disconnected from the current local area network. In order to facilitate sequencing the service priorities of the terminals, a technician can correspond the preset service types to the priorities one-to-one to form a correspondence between the service types and the priorities, and store the correspondence in the AP, as illustrated in Table. 1.

TABLE 1

| Service type | Priority |
| --- | --- |
| Watching a video | High |
| Playing an online game | Medium |
| Browsing a webpage | Low |

The AP detects the service types of data transmitted by the terminals currently accessing the local area network; sequences, according to the correspondence of the service types and the priorities as illustrated in Table 1, the terminals accessing the local area network based on the priorities of services; selects a terminal with a lowest priority; and determines the terminal as a target terminal, i.e., a terminal to be disconnected. For example, when the service types of the terminals currently accessing the local area network include watching a video and playing an online game, according to the above Table 1, the service priority of the terminal playing the online game is lower than the service priority of the terminal watching the video, and then the terminal playing the online game is determined as the target terminal.

In step 302, the AP sends a network standard inquiry message to the target terminal.

The network standard inquiry message may be a message for the AP to inquire the target terminal about the information on the cellular network standard which is supported by the target terminal. The cellular network standard may be 2G (2nd-Generation, 2nd-generation mobile communication technology specification), 3G (3rd-Generation, 3 rd-generation mobile communication technology), 4G (4th-Generation, 4th-generation mobile communication technology), 5G (5th-Generation, 5th-generation mobile communication technology), or GSM (Global System for Mobile communication), WCDMA (Wideband Code Division Multiple Access), LTE (Long Term Evolution, long-term evolution of universal mobile communication technology), or the like.

During implementation, when the AP has an event to notify the terminal, the AP will send Cellular Data Connection Preference (a notification message commonly used in the Wi-Fi protocol) to the target terminal. The Cellular Data Connection Preference may be used as a network standard inquiry message. The technician can add a field, which may be used to inquire the terminal on a network standard, into the Cellular Data Connection Preference. In the case of detecting a congestion event, the AP determining a target terminal will trigger the AP to send the Cellular Data Connection Preference to the target terminal. The added field can trigger the target terminal to send the information of the cellular network standard which is supported by the target terminal to the AP.

In step 303, the target terminal receives the network standard inquiry message sent by the AP.

During implementation, the AP, after determining the target terminal, sends the network standard inquiry message to the target terminal. The target terminal receives the network standard inquiry message sent by the AP and processes the received network standard inquiry message.

In step 304, the target terminal sends the information of the cellular network standard which is supported by the target terminal to the AP.

During implementation, the target terminal, after receiving the network standard inquiry message sent by the AP, acquires the information of the cellular network standard which is supported by the target terminal from a register that stores factory configuration information, and sends the acquired information of the cellular network standard to the AP. The information, sent by the target terminal to the AP, of the cellular network standard can be one or more cellular network standards which are supported by the target terminal.

Optionally, the target terminal sends the information of the cellular network standard which is supported by the target support to the AP in a manner of sending a management message to the AP. The corresponding processing method may be as follows:

sending the information of the cellular network standard which is supported by the target terminal to the AP through a Probe Request frame; or sending the information of the cellular network standard which is supported by the target terminal to the AP through an Association Request frame; or sending the information of the cellular network standard which is supported by the target terminal to the AP through a WNM-Notification Request frame.

The Probe Request frame, the Association Request frame, and the WNM-Notification Request frame are management messages sent by the target terminal to the AP under the Wi-Fi protocol.

During implementation, in the process of searching and accessing the local area network, the target terminal may usually send a Probe Request frame and an Association Request frame to the AP to be accessed. However, after having accessed to the local area network, the target terminal will send the WNM-Notification Request frame to the accessed AP when an event is triggered. An attribute value Cellular Data Capabilities Attribute is present in both the Probe Request frame and the Association Request frame, and a content field Cellular Data Connection is present in the Cellular Data Capabilities Attribute. An attribute value Cellular Data Capabilities Subelement is present in the WNM-Notification Request frame, and a content field Cellular Data Connection is also present in the Cellular Data Capabilities Subelement.

The Cellular Data Connection field includes a correspondence between values and meaning descriptions, as illustrated in Table 2.

TABLE 2

| Values | Meaning Descriptions |
|--------|---------------------|
| 0 | Reserved |
| 1 | Cellular Data Connection |
| 2 | Cellular Data Connection Unavailable |
| 3 | Cellular Data Capabilities Unavailable |
| 4-255 | Reserved |

If the AP detects a network congestion event during the target terminal searches and accesses a local area network, the AP will send Cellular Data Connection Preference to the target terminal. After the target terminal receiving the Cellular Data Connection Preference sent by the AP, the information of the cellular network standard which is supported by the target terminal will be carried by the Probe Request frame or the Association Request frame sent by the AP.

If the AP detects the network congestion event after the target terminal has accessed the local area network, the AP will send the Cellular Data Connection Preference to the target terminal. After the target terminal receiving the Cellular Data Connection Preference sent by the AP, will be triggered to send a WNM-Request frame to the AP, the WNM-Request frame carrying the information of the cellular network standard which is supported by the target terminal.

In order to facilitate carrying the information of the cellular network standard which is supported by the target terminal, the technician can perform one-to-one correspondence on the preset values and the cellular network standards which are supported by the target terminal, to further form a correspondence between the values and the cellular network standards which are supported by the target terminal. Based on the correspondence, the values and meanings carried by the Cellular Data Connection specified in the protocol are extended, as illustrated in Table 3.

TABLE 3

| Values | Meaning Descriptions |
|--------|---------------------|
| 0 | Reserved |
| 1 | Cellular Data Connection |
| 2 | Cellular Data Connection Unavailable |
| 3 | Cellular Data Capabilities Unavailable |
| 4 | Supporting 2G |
| 5 | Supporting 4G |
| 6-255 | Reserved |

Alternatively, the target terminal may provide more specific network standards which are supported by the target terminal to the AP, as illustrated in Table 4.

TABLE 4

| Values | Meaning Descriptions |
|--------|---------------------|
| 0 | Reserved |
| 1 | Cellular Data Connection |
| 2 | Cellular Data Connection Unavailable |
| 3 | Cellular Data Capabilities Unavailable |
| 4 | Supporting GSM |
| 5 | Supporting TD-LTE |
| 6-255 | Reserved |

In step 305, the AP receives the information of the cellular network standard which is supported by the target terminal sent by the target terminal.

During implementation, after the target terminal sends the information of the cellular network standard which supported by the target terminal to the AP, the AP can receive this information, and analyze the information.

Optionally, the AP receives the information of the cellular network standard which is supported by the target terminal by receiving a management message sent by the target terminal. The specific processing method may be as follows:

receiving the information of the cellular network standard which is supported by the target terminal sent by the target terminal through the Probe Request frame; or receiving the information of the cellular network standard which is supported by the target terminal sent by the target terminal through the Association Request frame; or receiving the information of the cellular network standard which is supported by the target terminal sent by the target terminal through the WNM-Notification Request frame.

During implementation, when the AP detects a network congestion event after the target terminal inquires and accesses the local area network, the AP may send the Cellular Data Connection Preference to the target terminal and then receive the Probe Request frame or the Association Request frame sent by the target terminal, the Probe Request frame or the Association Request frame carrying the information of the cellular network standard which is supported by the target terminal.

If the AP detects a network congestion event after the target terminal has accessed the local area network, and sends the Cellular Data Connection Preference to the target terminal, the AP may receive the WNM-Notification Request frame sent by the target terminal, the WNM-Notification Request frame carrying the information of the cellular network standard which is supported by the target terminal.

Optionally, the information of the cellular network standard which supported by the target terminal include a cellular network standard with a highest level supported by the target terminal.

During implementation, in the above steps, the information of the cellular network standard which is supported by the target terminal sent by the target terminal and the AP mutually may be a cellular network standard with the highest level which is supported by the target terminal. Taking a mobile phone (serving as a terminal) as an example, when the mobile phone can support a 2G network, a 3G network, and a 4G network, information of a cellular network standard sent by the mobile phone to the AP may be 4G.

In step 306, if the information of the cellular network standard which is supported by the target terminal satisfies a preset network switching condition, the AP may send a network switching notification to the target terminal, so as to enable the target terminal to be disconnected from the local area network and to access the cellular network.

During implementation, the AP receives the information of the cellular network standard which is supported by the target terminal sent by the target terminal, and then analyzes this information. If this information satisfies the preset network switching condition, it is indicated that it is possible for the target terminal to undergo network switching, and the AP then sends a network switching notification to the target terminal. According to this network switching notification, the target terminal can be disconnected from the local area network and access the cellular network. If this information does not satisfy the preset network switching condition, it is indicated that it is impossible for the target terminal to undergo network switching, and the target terminal is maintained in a state of accessing the current local area network.

Optionally, depending on the actual requirements, the network switching condition may be varied, and the processing mode in the corresponding step 306 may also be varied. There are several possible processing modes as follows.

In the first mode: if the cellular network standard with a highest level which is supported by the target terminal is not 2G, a network switching notification is sent to the target terminal.

During implementation, the AP receives the information of the cellular network standard with the highest level which is supported by the target terminal sent by the target terminal, and then analyzes this information. If the cellular network standard with the highest level which is supported by the target terminal is not 2G, the AP sends the network switching notification to the target terminal, such that the target network undergoes network switching. If the cellular network standard with the highest level which is supported by the target terminal is 2G, the AP does not send the network switching notification to the target terminal, and abandons determining the target terminal as the terminal to be disconnected, such that the target terminal is maintained in a state of accessing the current local area network established by the AP.

In the second mode: a pre-stored reference transmission rate corresponding to the cellular network standard with the highest level which is supported by the target terminal is acquired; and if the reference transmission rate is greater than a currently actual transmission rate of the target terminal in the local area network, a network switching notification will be sent to the target terminal.

During implementation, in order to facilitate the determination of the reference transmission rate corresponding to the cellular network standard with the highest level which is supported by the target terminal, the technician can store the cellular network standard with the highest level and a corresponding reference transmission rate in the AP in a form of correspondence table, as illustrated in Table 5.

TABLE 5

| Cellular network standard with the highest level | Reference transmission rate |
|---|---|
| 2G | 40 Kb/s |
| 3G | 2.5 Mb/s |
| 4G | 30 MB/s |

The AP may search the reference transmission rate corresponding to the cellular network standard with the highest level which is supported by the target terminal in Table 5 above. Then, this reference transmission rate is compared with the currently actual transmission rate of the target terminal in the local area network. If the reference transmission rate is greater than the actual transmission rate, it is indicated that the transmission rate will be increased by access to a cellular network if the target terminal is disconnected from the local area network, and the AP then sends a network switching notification to the target terminal, such that the target terminal is disconnected from the local area network and accesses the cellular network. If the reference transmission rate is not greater than the actual transmission rate, it is indicated that the transmission rate cannot be increased by access to the cellular network if the target terminal is disconnected from the local area network, and the AP does not send a network switching notification to the target terminal, such that the target terminal is maintained in a state of accessing this local area network.

In step 307, the target terminal receives the network switching notification sent by the AP.

In step 308, the target terminal is disconnected from the local area network established by the AP and accesses the cellular network.

Figure 4:
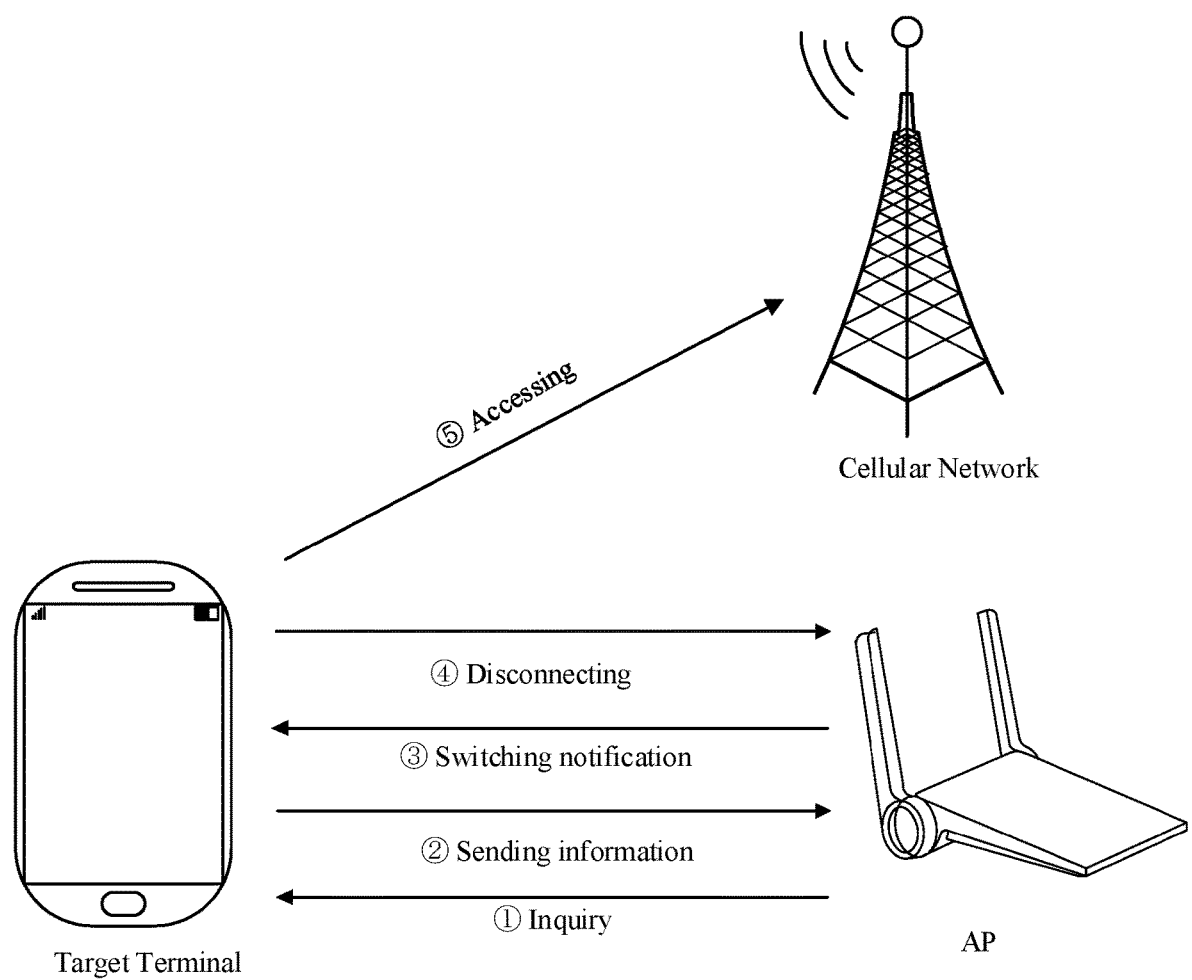
FIG. 4 is a schematic diagram illustrating network connection switching performed by a terminal according to an embodiment of the present disclosure.

During implementation, as illustrated in FIG. 4, after receiving the network switching notification sent by the AP, the target terminal is disconnected from the local area network established by the AP according to the network switching notification, and then accesses the cellular network, such that a service that performs data transmission with the local area network is transferred to the cellular network for performing data transmission continuously.

Optionally, specific processing of accessing the cellular network may be as follows: accessing the cellular network according to the cellular network standard with the highest level which is supported by the target terminal.

In the embodiment of the present disclosure, when there are a large number of terminal devices in a wireless local area network established by a router, some terminal may be switched into a cellular network in time and continue to perform data transmission, such that serious lagging of data transmission in the terminal in the local area network is avoided, thereby increasing the data transmission rate of the terminal.

Figure 5:
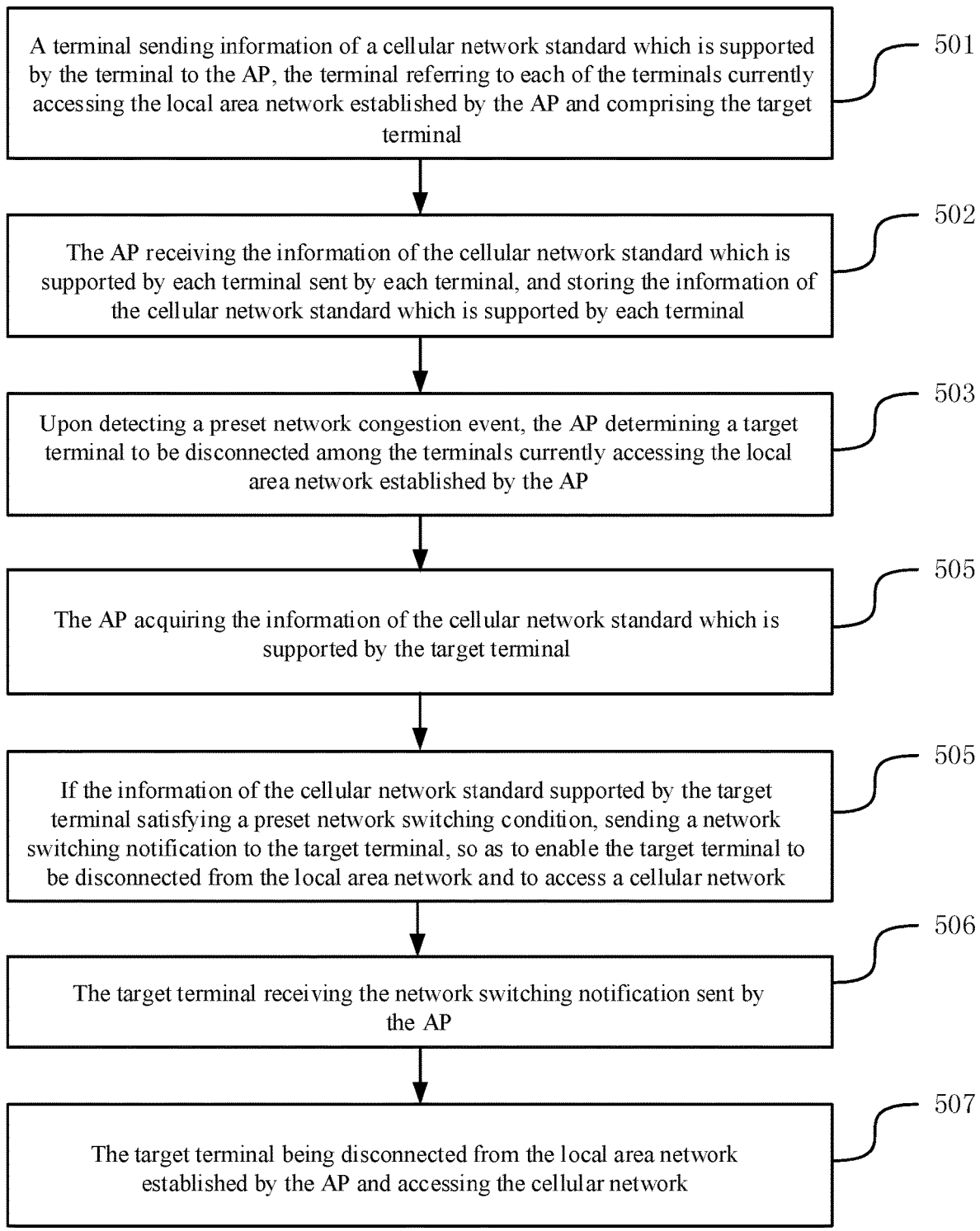
FIG. 5 is a flowchart of a network connection management method according to an embodiment of the present disclosure.

The processing flow as illustrated in FIG. 5 is described in detail below in conjunction with the embodiments. The content may be as follows.

In step 501, a terminal sends information of a cellular network standard which is supported by the terminal to the AP, wherein the terminal refers to each of the terminals currently accessing the local area network established by the AP and comprising the target terminal.

Optionally, each terminal sends the information of the cellular network standard which is supported by the target terminal to the AP in a manner of sending a management message to the AP. The corresponding processing method may be as follows:

sending the information of the cellular network standard which is supported by the target terminal to the AP through a Probe Request frame; or sending the information of the cellular network standard which is supported by the target terminal to the AP through an Association Request frame; or sending the information of the cellular network standard which is supported by the target terminal to the AP through a WNM-Notification Request frame.

The Probe Request frame, the Association Request frame, and the WNM-Notification Request frame are management messages sent by the target terminal to the AP under the Wi-Fi protocol.

During implementation, the processing method herein is similar to the relevant processing method in the previous embodiment, which thus can be referred to.

In step 502, the AP receives the information of the cellular network standard which is supported by each terminal sent by each terminal, and stores the information of the cellular network standard which is supported by each terminal.

Optionally, the AP receives the information of the cellular network standard which is supported by the target terminal by receiving a management message sent by the target terminal. The specific processing method may be as follows:

receiving the information of the cellular network standard which is supported by the target terminal sent by the target terminal through the Probe Request frame; or receiving the information of the cellular network standard which is supported by the target terminal sent by the target terminal through the Association Request frame; or receiving the information of the cellular network standard which is supported by the target terminal sent by the target terminal through the WNM-Notification Request frame.

During implementation, the processing method herein is similar to the relevant processing method in the previous embodiment, which thus can be referred to.

Optionally, the information of the cellular network standard which is supported by the target terminal includes a cellular network standard with a highest level which is supported by the target terminal.

During implementation, the processing method herein is similar to the relevant processing method in the previous embodiment, which thus can be referred to.

In step 503, upon detecting a preset network congestion event, the AP can determine a target terminal to be disconnected among the terminals currently accessing the local area network established by the AP.

During implementation, the processing method in step 503 is similar to the processing method in step 301 in the previous embodiment, and thus may be performed by referring to step 301 in the previous embodiment.

Optionally, the preset limit of network congestion can be set by a technician. The preset limit may be as follows: the quantity of terminals accessing the local area network exceeds a preset number threshold, or a transmission load ratio of the AP exceeds a preset ratio threshold.

During implementation, the processing method herein is similar to the relevant processing method in the previous embodiment, which thus can be referred to.

Optionally, among the terminals currently accessing the local area network established by the AP, the target terminal to be disconnected may be selected based on service priorities of data transmitted by the terminals. The corresponding selection method may be as follows: determining, according to a current service type of each terminal currently accessing the local area network established by the AP and a priority order of pre-stored service types, a target terminal having a service type with a lowest priority among the terminals as a terminal to be removed.

During implementation, the processing method herein is similar to the relevant processing method in the previous embodiment, which thus can be referred to.

In step 504, the AP acquires the information of the cellular network standard which is supported by the target terminal.

During implementation, after determining the target terminal, the AP acquires the stored information of the cellular network standard which is supported by each terminal, sent by each terminal to the AP, and searches the information of the cellular network standard which is supported by the target terminal, and extracts and processes the information.

In step 505, if the information of the cellular network standard which is supported by the target terminal satisfies a preset network switching condition, a network switching notification is sent to the target terminal, so as to enable the target terminal to be disconnected from the local area network and to access the cellular network.

During implementation, the processing method in step 505 is similar to the processing method in step 306 in the previous embodiment, and thus may be performed by referring to step 306 in the previous embodiment.

Optionally, depending on the actual requirements, the network switching condition may be varied, and the processing mode in the corresponding step 306 may also be varied. There are several possible processing modes as follows.

In the first mode: a network switching notification is sent to the target terminal if the cellular network standard of the highest level supported by the target terminal is not 2G.

In the second mode: a pre-stored reference transmission rate corresponding to the cellular network standard with a highest level which is supported by the target terminal is acquired; and a network switching notification is sent to the target terminal if the reference transmission rate is greater than a currently actual transmission rate of the target terminal in the local area network.

During implementation, the processing method herein is similar to the relevant processing method in the previous embodiment, which thus may by referred to.

In step 506, the target terminal receives the network switching notification sent by the AP.

In step 507, the target terminal is disconnected from the local area network established by the AP and accesses the cellular network.

Optionally, specific processing of accessing the cellular network may be as follows:

accessing the cellular network according to the cellular network standard with the highest level which is supported by the target terminal.

During implementation, the processing method herein is similar to the relevant processing method in the previous embodiment, which thus can be referred to.

In the embodiment of the present disclosure, when there are a large number of terminal devices in a wireless local area network established by a router, some terminal may be switched into a cellular network in time and continue to perform data transmission, such that a serious lagging of data transmission in the terminal in the local area network is avoided, thereby increasing the data transmission rate of the terminal.

Figure 6:
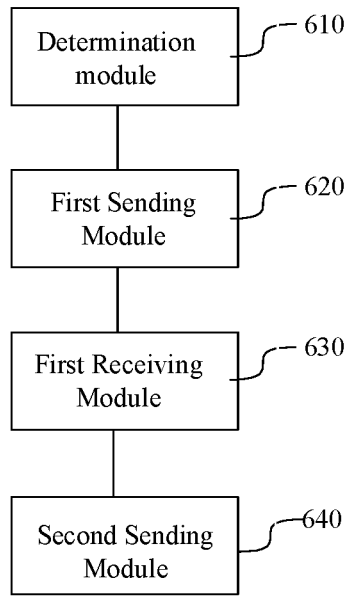
FIG. 6 is a schematic diagram illustrating an AP according to an embodiment of the present disclosure.

Based on the same technical concept, an embodiment of the present disclosure further provides an AP. As illustrated in FIG. 6, the AP includes:

a determination module 610, configured to, when a preset network congestion event is detected, determine a target terminal to be disconnected among terminals currently accessing a local area network established by the AP;

a first sending module 620 configured to send a network standard inquiry message to the target terminal;

a first receiving module 630 configured to receive information of a cellular network standard which is supported by the target terminal sent by the target terminal; and a second sending module 640 configured to, when the information of the cellular network standard which is supported by the target terminal satisfies a preset network switching condition, send a network switching notification to the target terminal, so as to enable the target terminal to be disconnected from the local area network and to access the cellular network.

Optionally, the network congestion event refers to a case that the number of terminals accessing the local area network exceeds a preset number threshold, or that a transmission load ratio of the AP exceeds a preset ratio threshold.

Optionally, the determination module 610 is further configured to:

determine, according to a current service type of each terminal currently accessing the local area network established by the AP and a priority order of pre-stored service types, a target terminal having a service type with a lowest priority among the terminals as a terminal to be disconnected.

Optionally, the first receiving module 630 is further configured to:

receive the information of the cellular network standard which is supported by the target terminal sent by the target terminal through a Probe Request frame; or receive information of the cellular network standard which is supported by the target terminal sent by the target terminal through an Association Request frame; or receive the information of the cellular network standard which is supported by the target terminal sent by the target terminal through a WNM-Notification Request frame.

Optionally, the information of the cellular network standard which supported by the target terminal includes the cellular network standard with a highest level which is supported by the target terminal.

Optionally, the second sending module 640 is further configured to:

send a network switching notification to the target terminal when the cellular network standard with the highest level which supported by the target terminal is not 2G.

Optionally, the second sending module 640 is further configured to:

acquire a pre-stored reference transmission rate corresponding to the cellular network standard with the highest level which is supported by the target terminal; and send a network switching notification to the target terminal when the reference transmission rate is greater than a currently actual transmission rate of the target terminal in the local area network.

Figure 7:
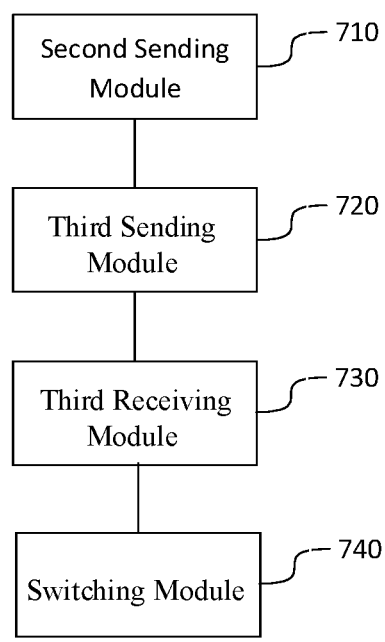
FIG. 7 is a schematic diagram illustrating a terminal according to an embodiment of the present disclosure.

Based on the same technical concept, an embodiment of the present disclosure further provides a terminal. As illustrated in FIG. 7, the terminal includes:

a second receiving module 710 configured to receive the network standard inquiry message sent by the AP;

a third sending module 720 configured to send the information of the cellular network standard which is supported by the target terminal to the AP;

a third receiving module 730 configured to receive the network switching notification sent by the AP; and a switching module 740 configured to disconnect from the local area network established by the AP and access the cellular network.

Optionally, the third sending module 720 is further configured to:

send the information of the cellular network standard which is supported by the target terminal through a Probe Request frame; or send the information of the cellular network standard which is supported by the target terminal through an Association Request frame; or send the information of the cellular network standard which is supported by the target terminal through a WNM-Notification Request frame.

Optionally, the information of the cellular network standard which is supported by the target terminal includes a cellular network standard with the highest level which is supported by the target terminal.

Optionally, the switching module 740 is further configured to:

access the cellular network according to the cellular network standard with the highest level which is supported by the target terminal.

With regard to the device in the above embodiment, the specific manner in which the respective modules perform the operations has been described in detail in the embodiment relating to the method, and will not be elaborated herein.

In the embodiment of the present disclosure, when there are a large number of terminal devices in a wireless local area network established by a router, some terminal may be switched into a cellular network in time and continue to perform data transmission, such that a serious lagging of data transmission in the terminal in the local area network is avoided, thereby increasing the data transmission rate of the terminal.

Based on the same technical concept, an embodiment of the present disclosure further provides a network connection management system. The system comprises an AP and a terminal.

The AP is configured to, when a preset network congestion event is detected, determine a target terminal to be disconnected among terminals currently accessing a local area network established by the AP; send a network standard inquiry message to the target terminal; receive information of a cellular network standard which is supported by the target terminal sent by the target terminal; and if the information of the cellular network standard which is supported by the target terminal satisfies a preset network switching condition, send a network switching notification to the target terminal, so as to enable the target terminal to be disconnected from the local area network and to access a cellular network.

The terminal is configured to receive the network standard inquiry message sent by the AP; send the information of the cellular network standard which is supported by the target terminal to the AP; receive a network switching notification sent by the AP; and disconnect from the local area network established by the AP and access the cellular network.

It should be noted that, when the network connection management device provided by the above embodiment performs network connection management, examples are given by illustrating the individual functional modules. In actual application, the above functions may be performed by different functional modules, that is, the internal structure of the device may be divided into different functional modules to realize all or part of the above-described functions. Besides, the network connection management device and the network connection management method provided by the above embodiments belong to the same disclosure concept, and the specific operating procedures of the device and method may refer to the method embodiments. Therefore, the description thereof will not be elaborated herein.

A further exemplary embodiment of the present disclosure illustrates a schematic structural diagram of an access point AP.

Figure 8:
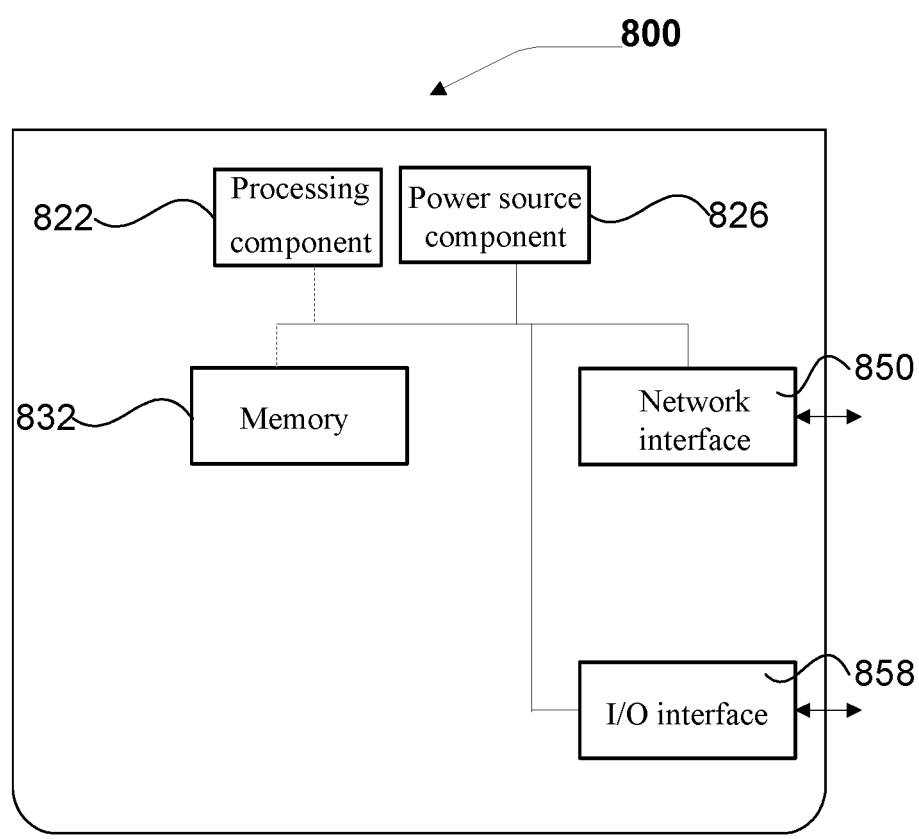
FIG. 8 is a schematic structural diagram of an AP according to an embodiment of the present disclosure.

Referring to FIG. 8, the apparatus 800 includes a processing component 822 which further includes one or more processors, and memory resources represented by a memory 832 for storing instructions executable by the processing component 822, for example an application program. The application program stored in the memory 832 may include one or more modules, each of which corresponds to a set of instructions. Further, the processing component 822 is configured to execute instructions to perform the network connection management method as described above.

The apparatus 800 may further include a power source component 826 configured to perform power source management for the apparatus 800, a wired or wireless network interface 850 configured to connect the apparatus 800 to a network, and an input/output (I/O) interface 858.

The apparatus 800 may include a memory, and one or more programs, wherein the one or more programs are stored in the memory. The one or more programs configured to be executed by one or more processors include instructions for performing the above method embodiments.

Another Exemplary embodiment of the present disclosure illustrates a schematic structural view of a terminal. The terminal may be a device which can use and a cellular network, such as a smart phone, a smart watch, a tablet PC and the like.

Figure 9:
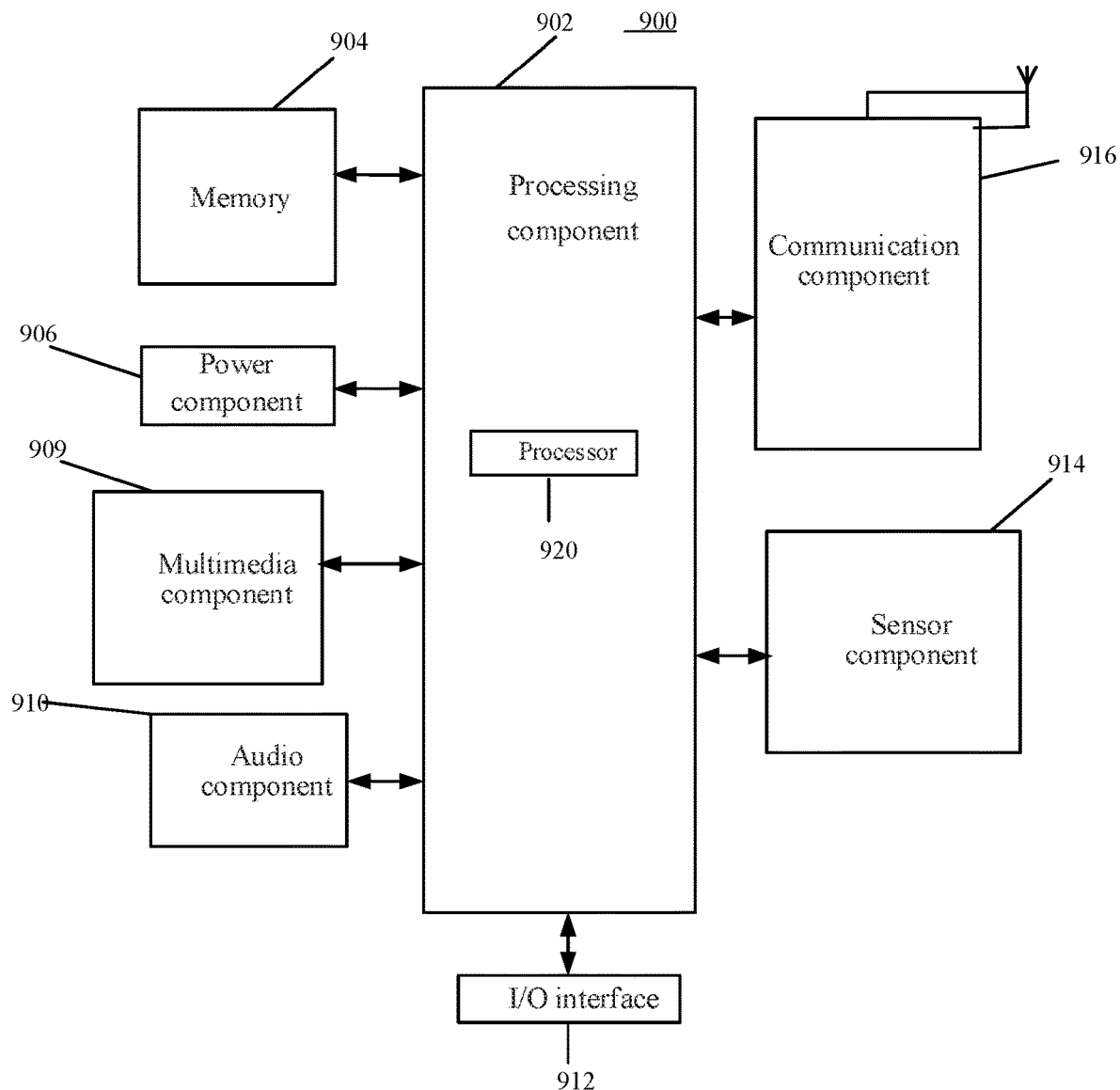
FIG. 9 is a schematic structural diagram of a terminal according to an embodiment of the present disclosure.

Referring to FIG. 9, the terminal 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the terminal 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interactions between the processing component 902 and other components. For instance, the processing component 902 may include a multimedia module to facilitate the interaction between the multimedia component 908 and the processing component 902.

The memory 904 is configured to store various types of data to support the operation of the terminal 900. Examples of such data include instructions for any applications or methods operated on the terminal 900, contact data, phonebook data, messages, pictures, videos, etc. The memory 904 may be implemented through any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the terminal 900. The power component 906 may include a power management system, one or more power sources, and any other components associated with generation, management, and distribution of power in the terminal 900.

The multimedia component 908 includes a screen providing an output interface between the terminal 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may sense not only a boundary of a touch or swipe action, but also the duration and pressure associated with the touch or swipe action. In some embodiments, the multimedia component 908 includes a front camera and/or a rear camera. The front camera and the rear camera may receive external multimedia data while the terminal 900 is in an operation mode, such as a shooting mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive external audio signals when the terminal 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, such as a keyboard, a click wheel, buttons, and the like. The buttons may include, but are not limited to, a home button, a volume button, a start button, and a locking button.

The sensor component 914 includes one or more sensors to provide status assessments of various aspects of the terminal 900. For instance, the sensor component 914 may detect an ON/OFF status of the terminal 900, relative positioning of components, e.g., the display device and the mini keyboard of the terminal 900, and the sensor component 914 may also detect a position change of the terminal 900 or a component of the terminal 900, presence or absence of user contact with the terminal 900, orientation or acceleration/deceleration of the terminal 900, and temperature change of the terminal 900. The sensor component 914 may include a proximity sensor configured to detect the presence of nearby objects without any physical contact. The sensor component 914 may further include a light sensor, such as a CMOS or CCD image sensor, for imaging applications. In some embodiments, the sensor component 914 may further include an accelerometer sensor, a gyroscope sensor, a magnetic sensor, a pressure sensor, or a temperature sensor.

The communication component 916 is configured to facilitate communication, wired or wirelessly, between the terminal 900 and other devices. The terminal 900 can access a wireless network based on a communication standard, such as Wi-Fi, 2G, or 3G, or a combination thereof. In an exemplary embodiment, the communication component 916 receives broadcast signals or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is further provided, such as the memory 904 including instructions, executable by the processor 920 in the terminal 900, for performing the above-described methods. For example, the non-transitory computer-readable storage medium may be a ROM, a RAM, a CD-ROM, a magnetic tape, a floppy disc, an optical data storage device, and the like.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A network connection management method, which is applicable to an access point (AP) and comprises:
   upon detecting a preset network congestion event, determining a target terminal to be disconnected among terminals currently accessing a local area network established by the AP;
   acquiring information of a cellular network standard which is supported by the target terminal; and
   sending a network switching notification to the target terminal when the information of the cellular network standard which is supported by the target terminal satisfies a preset network switching condition, so as to enable the target terminal to be disconnected from the local area network and to access the cellular network,
   wherein the determining the target terminal to be disconnected among the terminals currently accessing the local area network established by the AP comprises:
   determining, according to a current service type of each of the terminals currently accessing the local area network established by the AP and a priority order of pre-stored service types, a target terminal having a service type with a lowest priority among the terminals as a terminal to be disconnected.

2. The method according to claim 1, wherein the network congestion event comprises a case that a quantity of terminals accessing the local area network exceeds a preset number threshold, or a transmission load ratio of the AP exceeds a preset ratio threshold.

3. The method according to claim 1, further comprising:
   receiving the information of the cellular network standard which is supported by the target terminal sent by the target terminal, and storing the information of the cellular network standard which is supported by the target terminal.

4. The method according to claim 3, wherein the receiving the information of the cellular network standard which is supported by the target terminal sent by the target terminal comprises:
   receiving the information of the cellular network standard which is supported by the target terminal sent by the target terminal through a Probe Request frame; or
   receiving the information of the cellular network standard which is supported by the target terminal sent by the target terminal through an Association Request frame; or
   receiving the information of the cellular network standard which is supported by the target terminal sent by the target terminal through a WNM-Notification Request frame.

5. The method according to claim 1, wherein the acquiring the information of the cellular network standard which is supported by the target terminal comprises:
   sending a network standard inquiry message to the target terminal; and
   receiving the information of the cellular network standard which is supported by the target terminal sent by the target terminal.

6. The method according to claim 1, wherein the information of the cellular network standard which is supported by the target terminal comprises a cellular network standard with a highest level which is supported by the target terminal.

7. The method according to claim 6, wherein the sending the network switching notification to the target terminal when the information of the cellular network standard which is supported by the target terminal satisfies the preset network switching condition comprises:
   sending the network switching notification to the target terminal when the cellular network standard of the highest level supported by the target terminal is not 2G.

8. The method according to claim 6, wherein the sending the network switching notification to the target terminal when the information of the cellular network standard which is supported by the target terminal satisfies the preset network switching condition comprises:
   acquiring a pre-stored reference transmission rate corresponding to the cellular network standard with a highest level which is supported by the target terminal; and
   sending the network switching notification to the target terminal when the reference transmission rate is greater than an actual transmission rate of the target terminal currently in the local area network.

9. The method according to claim 1, the method being implemented by a communication system, and the communication system comprising the AP and the terminals, wherein in a case that number of the terminals used in the wireless local area network established by a router is large, the communication system is configured to switch the target terminal to the cellular network in a timely manner and continue to perform data transmission, to thereby avoid serious lagging of the data transmission of the terminal in the local area network, and increasing a data transmission rate of the target terminal.

10. A network connection management method, which is applicable to a target terminal and comprises:
    sending information of a cellular network standard which is supported by the target terminal to an access point (AP);
    receiving a network switching notification sent by the AP; and disconnecting from a local area network established by the AP, and accessing the cellular network, wherein the sending the information of the cellular network standard which is supported by the target terminal to the AP comprises:

sending the information of the cellular network standard which is supported by the target terminal to the AP through a Probe Request frame; or sending the information of the cellular network standard which is supported by the target terminal to the AP through an Association Request frame; or sending the information of the cellular network standard which is supported by the target terminal to the AP through a WNM-Notification Request frame.

11. The method according to claim 10, wherein the information of the cellular network standard which is supported by the target terminal comprises a cellular network standard with a highest level which is supported by the target terminal.

12. The method according to claim 10, wherein the accessing the cellular network comprises:

accessing the cellular network according to the cellular network standard with a highest level which is supported by the target terminal.

13. The method according to claim 10, wherein the method is implemented by a terminal, the terminal comprising a processor and a memory in which at least one instruction is stored for execution by the processor to implement operations of the method.

14. An access point (AP), comprising a processor and a memory in which at least one instruction is stored for execution by the processor to:

determine a target terminal to be disconnected among terminals currently accessing a local area network established by the AP, upon detecting a preset network congestion event;

acquire information of a cellular network standard which is supported by the target terminal; and send a network switching notification to the target terminal when the information of the cellular network standard which is supported by the target terminal satisfies a preset network switching condition, so as to enable the target terminal to be disconnected from the local area network and to access the cellular network, wherein when the processor is configured to be disconnected among the terminal currently accessing the local area network established by the AP, the processor is configured to:

determine, according to a current service type of each of the terminals currently accessing the local area network established by the AP and a priority order of pre-stored service types, a target terminal having a service type with a lowest priority among the terminals as a terminal to be disconnected.

15. The AP according to claim 14, wherein the network congestion event comprises a case that a quantity of terminals accessing the local area network exceeds a preset number threshold, or a transmission load ratio of the AP exceeds a preset ratio threshold.

16. The AP according to claim 14, wherein the processor is further configured to:

receive the information of the cellular network standard which is supported by the target terminal sent by the target terminal, and store the information of the cellular network standard which is supported by the target terminal;

wherein when the processor is configured to receive the information of the cellular network standard which is supported by the target terminal sent by the target terminal, the processor is configured to:

receive the information of the cellular network standard which is supported by the target terminal sent by the target terminal through a Probe Request frame; or receive the information of the cellular network standard which is supported by the target terminal sent by the target terminal through an Association Request frame; or receive the information of the cellular network standard which is supported by the target terminal sent by the target terminal through a WNM-Notification Request frame.

17. The AP according to claim 14, wherein when the processor is configured to acquire the information of the cellular network standard which is supported by the target terminal, the processor is configured to:

send a network standard inquiry message to the target terminal; and receive the information of the cellular network standard which is supported by the target terminal sent by the target terminal.

\* \* \* \* \*